(12) United States Patent
Foster

(10) Patent No.: US 7,338,553 B2
(45) Date of Patent: Mar. 4, 2008

(54) PROCESS, COMPOUND, INK AND USE

(75) Inventor: Clive Edwin Foster, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 11/524,434

(22) Filed: Sep. 21, 2006

(65) Prior Publication Data

US 2007/0079729 A1 Apr. 12, 2007

(30) Foreign Application Priority Data

Oct. 8, 2005 (GB) ................................. 0520539.8

(51) Int. Cl.
*C09D 11/00* (2006.01)
*C09D 11/02* (2006.01)
*C07D 241/36* (2006.01)
*B41J 2/01* (2006.01)

(52) U.S. Cl. ................................ 106/31.47; 106/31.32; 106/31.15; 544/338; 544/339; 544/342; 347/100

(58) Field of Classification Search ............. 106/31.47, 106/31.77, 31.15, 31.32, 31.64; 347/100; 544/338, 342
See application file for complete search history.

(56) References Cited

U.S. PATENT DOCUMENTS

| 2,495,202 A | * | 1/1950 | Switzer et al. | ............... 544/342 |
| 3,211,694 A | * | 10/1965 | Altermatt | ..................... 524/90 |
| 3,419,557 A | * | 12/1968 | Deuschel et al. | ........... 544/339 |

FOREIGN PATENT DOCUMENTS

| DE | 3504143 A1 | 7/1986 |
| GB | 924002 | 4/1963 |
| GB | 926245 | 5/1963 |
| GB | 935630 | 9/1963 |
| GB | 970471 | 9/1964 |
| GB | 970472 | 9/1964 |
| GB | 1008467 | 10/1965 |
| PL | 65253 | 4/1972 |

OTHER PUBLICATIONS

American Chemical Society Registry 2001: Nos. 102134-09-8; 102134-10-1; 102634-68-4; 103306-64-5; 104038-08-6; 106516-86-3; 106516-87-4; 106515-88-5; 106516-89-6; 106516-90-9; 106516-91-0; 106516-92-1; 106516-93-2; 106517-12-8; 106517-13-9; 106517-14-0; 106517-15-1; 106517-16-2; 106517-17-3; 106517-18-4; 106517-19-5; 106517-20-8; 106517-21-9; 106517-22-0; 106517-23-1; 106517-24-2; 106517-25-3; 106517-26-4; 106517-27-5; 106567-74-0; 120745-3802; 120745-39-3; 184718-63-6; 258-43-5; 258-79-7; 531-48-6; 53232-29-4; 53232-30-7; 613-05-8; 69637-93-0; 95690-06-5; 95710-57-9; 97435-94-4; 97527-83-8; 97594-43-9; 97620-75-2; 97737-56-9; 97979-49-2; 98000-59-0; 98339-12-9; 98339-13-0; 98339-14-1; 98339-15-2; 99100-64-8; no date available.

Radulescu et al, "New Alkylated Diquinoxaline-Piperazine Dicarboxylic Acids Obtained by Synthesis", Revista de Chimie (Bucharest, Romania) 2005, 56(7):742-745, no month available.

Radulescu, "Synthesis and Characteristics of Diquinoxaline[2,3-b][2,3-e] Piperazine-6,6'-Dicarboxylic Acid and Diquinoxaline[2,3-b]2,3-ePiperazine-6,7'-Dicarboxylic Acid", Revista de Chimie (Bucharest, Romania) 2005, 56(2):151-154, no month available.

Nippon Kagaku Zasshi, 1959 80:945-947 and Chemical Abstracts, Abstr. No. 55:4514e-h, no date available.

Ahmad et al., "Synthesis of some substituted quinoxalines and prolycyclic systems containing the quinoxaline nucleus", J. Chem. Soc., Perkins Transactions 1, 20:2443-2449; (1995) ISSN 0300-922X, HCAPLUS 1996:668600 (Abstract), no month.

Iben et al., "Fluorescent dyes for solar collectors", Forschungsber-Bundesminst. Forsch Technol. Technol. Forsch. Entwickl (1984), BMFT-FB-T, 84-164, 115, ISSN 0340-7608, HCAPLUS 1985:150903 (Abstract), no month.

Malanker et al., "Polycyclic pigments—synthesis, properties anti applications Part 1 Quinacridone, fluorubine, diketopyrrolopyrrole and quinophthalone", Paintindia (1996), 46(10):45-51, ISSN 0556-4409, HCAPLUS 1996:758374 (Abstract), no month.

* cited by examiner

*Primary Examiner*—Helene Klemanski
(74) *Attorney, Agent, or Firm*—Morgan, Lewis & Bockius LLP

(57) ABSTRACT

A process for printing an image on a substrate comprising applying to the substrate an ink comprising a compound of Formula (1) or a salt thereof:

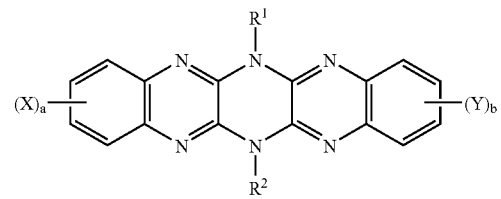

Formula (1)

wherein:
$R^1$ and $R^2$ are each independently H or a substituent;
each X and Y independently is a substituent; and
a and b are each independently 0, 1, 2, 3 or 4. The compounds used in the process have particularly good ozone fastness and are suitable for preparing inks which can be ink jet printed.

23 Claims, No Drawings

PROCESS, COMPOUND, INK AND USE

This invention relates to a printing process, to compounds used in the process, to inks (especially but not exclusively ink jet printing (IJP) inks), to the use of said compounds for preparing inksand to ink jet cartridges and printers containing ink jet printing inks.

Colorants used in printing inks desirably have good colour properties, for example, high tinctorial strength, hue and chroma. These properties are especially important for the reproduction of vivid colours when printing photographs. It is also desirable for colorants to have good light-fastness and ozone-fastness so that the printed image is resistant to fading on exposure to light or ozone present in air. Colorants with good colour properties often have relatively poor light-fastness and vice versa.

Accordingly there is a need for colorants which have good colour properties, light-fastness and in particular, have good ozone-fastness.

We have surprisingly found that certain compounds meet the abovementioned need. Furthermore, these compounds can be used to prepare stable inks which are particularly suitable for ink jet printing.

U.S. Pat. No. 2,495,202 discloses certain heterocyclic fluorescent colouring materials which exhibit strong orange or red daylight fluorescence in sea water.

According to a first aspect of the present invention there is provided a process for printing an image on a substrate comprising applying to the substrate an ink comprising a compound of Formula (1) or a salt thereof:

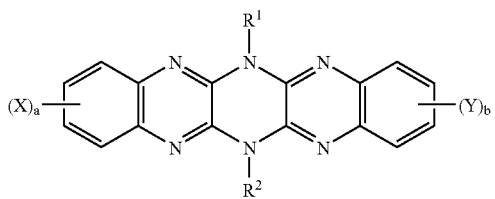

Formula (1)

wherein:
$R^1$ and $R^2$ are each independently H or a substituent;
each X and Y independently is a substituent; and
a and b are each independently 0, 1, 2, 3 or 4.

Preferably, $R^1$ and $R^2$ are each independently H, optionally substituted alkyl, optionally substituted alkoxy, optionally substituted aryl or optionally substituted aryloxy.

Preferably each X and each Y independently is optionally substituted alkyl, optionally substituted alkoxy, optionally substituted aryl, optionally substituted aryloxy, optionally substituted heterocyclyl, poly(alkyleneoxy), —$NR^3R^4$, —$NHC(O)R^4$, —$NHC(O)NR^3R^4$, —$C(O)R^4$, —$C(O)OR^4$, —$C(O)NR^3R^4$, —$PO_3H_2$, —$SR^3$, —$SO_2R^3$, —$SO_2OR^3$, —$SO_2NR^3R^4$, —$S(O)R^3$, —$CF_3$, CN, —$NO_2$ or halo (especially chloro or fluoro), wherein $R^3$ and $R^4$ are each independently H, optionally substituted $C_{1-8}$-alkyl or optionally substituted aryl, or $R^3$ and $R^4$ together with the nitrogen atom to which they are attached form an optionally substituted 5- or 6-membered ring.

Preferred optionally substituted alkyl groups are optionally substituted $C_{1-8}$-alkyl, more preferably optionally substituted $C_{1-4}$-alkyl. Examples of optionally substituted alky groups include methyl, ethyl, propyl, isopropyl, butyl, trifluoromethyl, hydroxyethyl, sulfopropyl and carboxyethyl.

Preferred optionally substituted alkoxy groups are optionally substituted $C_{1-8}$-alkoxy, more preferably optionally substituted $C_{1-4}$-alkoxy. Examples of optionally substituted alkoxy groups include methoxy, ethoxy, propoxy, isopropoxy, butoxy, carboxypropyloxy, carboxyethoxy, hydroxyethoxy and chloroethoxy.

Preferred optionally substituted aryl groups are optionally substituted phenyl groups. Examples of optionally substituted aryl groups include carboxyphenyl, sulfophenyl, nitrophenyl and chlorophenyl.

Preferred optionally substituted aryloxy groups are optionally substituted phenoxy groups. Examples of optionally substituted aryloxy groups include carboxyphenoxy, sulfophenoxy, nitrophenoxy and chlorophenoxy.

The optional substituents which may be present on $R^1$, $R^2$, $R^3$, $R^4$, X and Y are preferably selected from $C_{1-4}$-alkyl, $C_{1-4}$-alkoxy, —$NR^5R^6$, —$NHC(O)R^5$, —$NHC(O)NR^5R^6$, —$C(O)R^5$, —$C(O)OR^5$, —$C(O)NR^5R^6$, —$PO_3H_2$, —$SR^5$, —$SO_2R^6$, —$SO_2OR^5$, —$SO_2NR^5R^6$, —$S(O)R^5$, —$CF_3$, —CN, —$NO_2$ and halo (especially chloro and fluoro), wherein $R^5$ and $R^6$ are each independently H, $C_{1-4}$-alkyl, $C_{1-4}$-alkyl-OH, $C_{1-4}$-alkyl-$SO_3H$ or phenyl, or $R^5$ and $R^6$ together with the nitrogen atom to which they are attached form 5- or 6-membered ring. More preferably, the optional substituents which may be present on $R^1$, $R^2$, $R^3$, $R^4$ and X and Y are selected from hydroxy, halo, carboxy (i.e. —$CO_2H$), phosphato (i.e. —$PO_3H_2$), —$SO_2NR^3R^4$ and sulfo (i.e. —$SO_3H$).

Preferably, $R^1$ and $R^2$ are H.

Preferably, a and b are not both zero.

Preferred X and Y groups are each independently poly(ethyleneoxy), carboxy, sulfo, —phosphato, or —$SO_2NR^3R^4$ groups wherein $R^3$ and $R^4$ are as hereinbefore defined. The presence of such groups can provide compounds having improved solubility in inks, especially aqueous inks. In one embodiment the compound of Formula (1) or salt thereof comprises from 1 to 6 ink solubilising groups (e.g. poly(ethyleneoxy), carboxy, sulfo, —$SO_2NR^3R^4$ or phosphato groups, wherein $R^3$ and $R^4$ are as hereinbefore defined).

$R^3$ and $R^4$ in the —$SO_2NR^3R^4$ groups preferably are each independently H, substituted $C_{1-6}$alkyl or a substituted phenyl group wherein the substituents are one or more groups each independently selected from sulfo, carboxy, phosphato and hydroxy groups because such groups are particularly useful for providing compounds having good solubility in an aqueous ink.

Preferably, the compound of Formula (1) or salt thereof has at least one sulfo group. More preferably, the compound of Formula (1) has from 1 to 8, more preferably from 2 to 6 sulfo groups.

Preferably, the compound of Formula (1) or salt thereof has a total of 2, 3 or 4 sulfo groups.

In a preferred embodiment X and Y are sulfo and a and b are each independently 0, 1 or 2, provided that a and b are not both zero. In this preferred embodiment $R^1$ and $R^2$ are preferably H. The compounds of this embodiment are generally water-soluble dyes which can be used to prepare inks which demonstrate particularly good operability when printed from an ink jet printer.

In a preferred embodiment the compound of Formula (1) is of Formula (2), Formula (3) or Formula (4), or a salt thereof, or a mixture of 2 or more of compounds of Formula (2), Formula (3) or Formula (4) or salts thereof:

Formula (2)

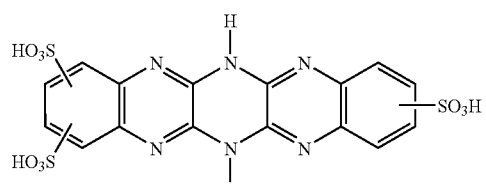

Formula (3)

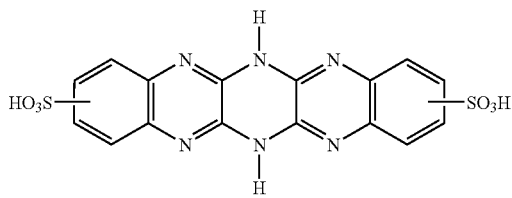

Formula (4)

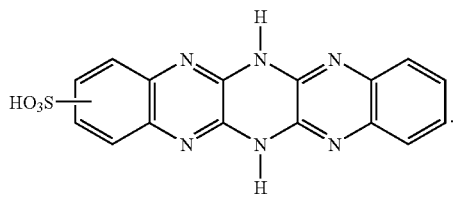

The compounds of Formulae (2), (3) and (4) are water soluble dyes having excellent light-fastness, ozone-fastness and colour properties. These dyes are particularly suitable for preparing IJP inks, the resultant inks having particularly good operability and being able to provide high quality prints. Preferably, the compounds of Formulae (1), (2), (3) and (4) are in the form of the free acid or in the form of a salt with a monovalent metal, an optionally substituted ammonium compound or in the form of a mixed salt with a monovalent metal and an optionally substituted ammonium compound. Preferably, the compounds of Formulae (1), (2), (3) and (4) are in the form of a lithium or potassium salt, more preferably an optionally substituted ammonium salt and especially an ammonium salt.

Compounds of Formula (1) in the form of an ammonium salt often have better dispersibility and/or solubility in aqueous inks compared to other salt forms.

Preferably, the compound of Formula (1) or salt thereof is a dye, more preferably a water-soluble dye. Preferably the compound of Formula (1) or salt thereof has a solubility in water of at least 5%, more preferably 10%, by weight at a temperature of 25° C. Such dyes are especially useful for preparing ink jet printing inks.

Preferably, the compounds of Formula (1) or salt thereof are suitable for making inks which, when printed on paper, give yellow or orange prints.

The compounds of Formula (1) or salts thereof are preferably free from fibre reactive groups because no such groups are required and such groups tend to reduce operability in ink jet printing inks. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. Examples of fibre reactive groups which are preferably not present in the compounds of Formula (1) or salt thereof include: halo-1,3,5-triazinyl, halo-pyrimidyl, beta-halo-propionyl, beta-halo ethyl-sulphonyl, beta-sulfonic acid ethyl-sulfonyl, beta-halo ethylsulfamyl, chloroacetyl amino, beta-sulfonic acid ethyl sulphamyl and vinyl sulphonyl groups.

The compounds used in the process according to the first aspect of the present invention may also exist in tautomeric forms other than those shown in this specification. These tautomers are also included within the scope of the claims of the present invention. For example, the compound of Formula (1) or salt thereof wherein $R^1$ and $R^2$ are both H may exist as tautomeric Formula (T):

Tautomeric Formula (T)

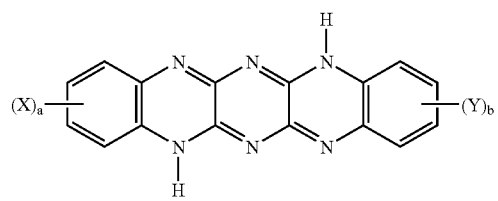

According to a second aspect of the present invention there is provided a compound of Formula (1) or a salt thereof as defined in the first aspect of the present invention with the proviso that the compound of Formula (1) or salt thereof is not a compound of Formula (3), (4) or (5) in the form of the free acid or the sodium salt or a compound of Formula (6):

Formula (3)

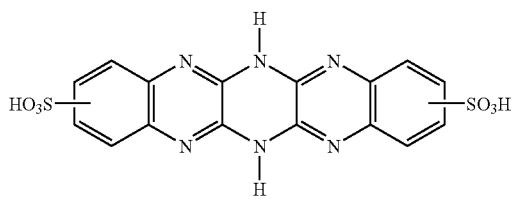

Formula (4)

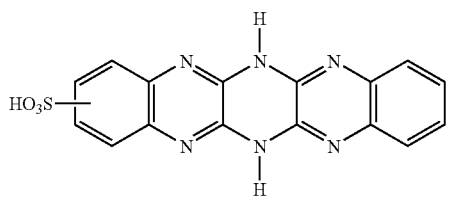

Formula (5)

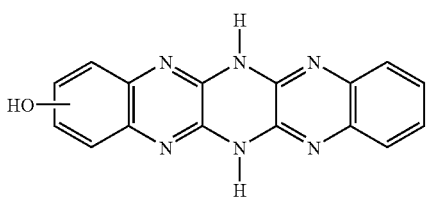

Formula (6)

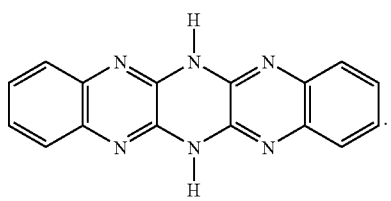

The preferences for the compounds of the second aspect of the present invention are as described above in relation to the compounds used in the first aspect of the present invention.

In one embodiment the compound of Formula (1) or salt thereof has at least one poly(ethyleneoxy), —SO$_2$NR$^3$R$^4$ (wherein R$^3$ and R$^4$ are as hereinbefore defined) or phosphato group or a carboxy group. In this embodiment these groups are preferably a substituent on X and/or Y, more preferably at least one of the groups represented by X and Y is selected from poly(ethyleneoxy), —SO$_2$NR$^3$R$^4$, phosphato and carboxy groups (wherein R$^3$ and R$^4$ are as hereinbefore defined). R$^3$ and R$^4$ in the —SO$_2$NR$^3$R$^4$ groups are preferably each independently selected from H, substituted C$_{1-6}$-alkyl or a substituted phenyl group, wherein the substituents are one or more groups each independently selected from sulfo, carboxy, phosphato and hydroxy groups. These compounds provide inks which, when printed, provide images having good ozone fastness In a further embodiment the compound of Formula (1) or salt thereof has at least one sulfo group and at least one group other than a sulfo group. Preferably, the group(s) other than sulfo are selected from optionally substituted alkyl, optionally substituted alkoxy, optionally substituted aryl, optionally substituted aryloxy, an optionally substituted heterocyclic group, poly alkyleneoxy, —NR$^3$R$^4$, —NHC(O)R$^4$, —NHC(O)NR$^3$R$^4$, —C(O)R$^4$, —C(O)OR$^4$, —C(O)NR$^3$R$^4$, —PO$_3$H$_2$, —SR$^3$, —SO$_2$R$^3$, -sulfonic acid ester, —SO$_2$NR$^3$R$^4$, —S(O)R$^3$, —CF$_3$, —CN, —NO$_2$ or halo, wherein R$^3$, R$^4$ and the optional substituents are as hereinbefore defined. Preferably the sulfo group and the group other than a sulfo group are present in X and/or Y, more preferably at least one of the groups represented by X and Y is a sulfo group and at least one of the groups represented by X and Y is a group other than a sulfo group. The presence of the sulfo group(s) tends to improve the solubility and storage stability of the compounds in aqueous inks. The presence of a group other than the sulfo group(s) allows the properties of the compound of Formula (1) or salt thereof to be fine tuned.

In another embodiment the compound of Formula (1) is any one of the compounds of Formulae (7) to (12) or a salt thereof:

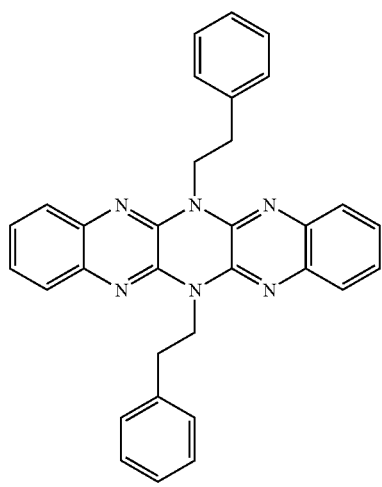

Formula (7)

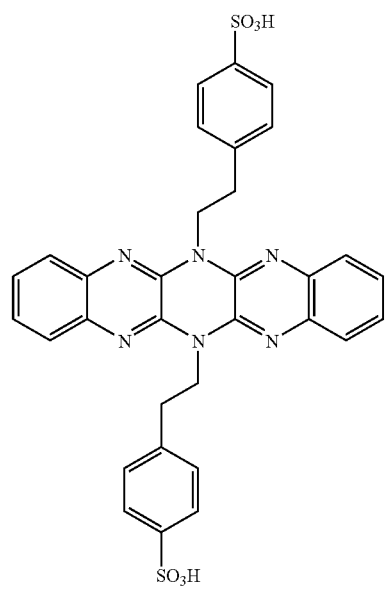

Formula (8)

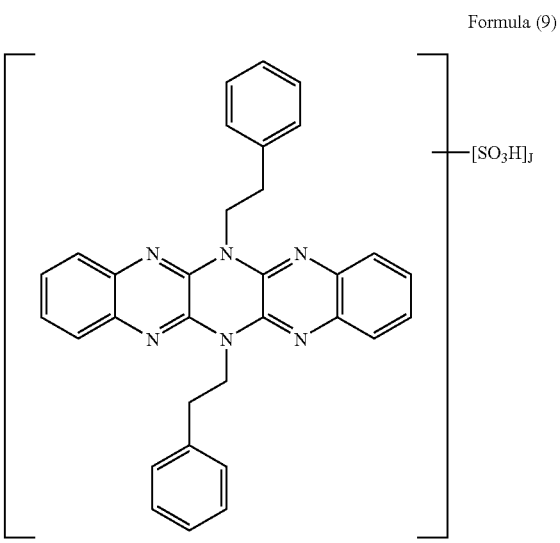

wherein J is from 3 to 6;

Formula (9)

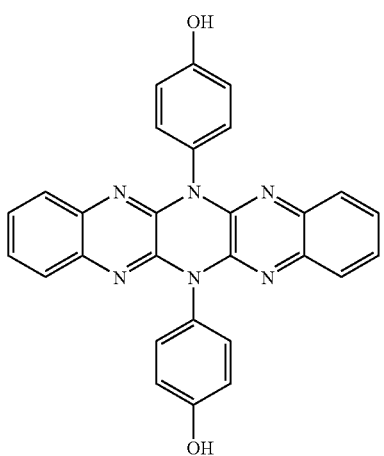

Formula (10)

-continued

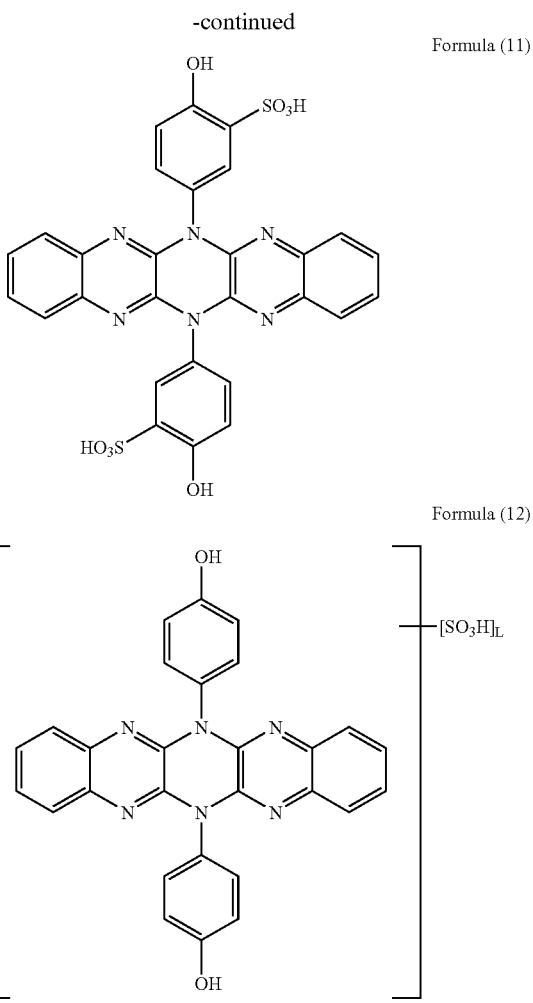

Formula (11)

Formula (12)

wherein L is from 2 to 5.

The compounds of Formula (1) or salts thereof may be prepared from, for example, a compound of Formula (6), e.g. by an electrophilic substitution reaction performed on a compound of Formula (6). One method for preparing the compound of Formula (6) is by the synthetic process as outlined in U.S. Pat. No. 2,495,202 steps 1 to 4, which is incorporated herein by reference thereto.

Compounds of Formula (1) or salts thereof wherein $R^1$ and $R^2$ are not both H may be prepared by, for example, reacting 2,3-dichloroquinoxaline (commercially available from Acros and Aldrich) with a primary amine.

Compounds of Formula (1) or salts thereof where a and/or b is not 0 may also be prepared from 2,3-dichloroquinoxaline compound(s) carrying an X or Y groups, as hereinbefore defined. Substituted 2,3-dichloroquinoxaline compounds are preferably prepared from substituted 1,2-diamino benzene compounds which are ring closed with, for example, oxyalyl chloride to give the substituted 2,3-dihydroxyquninoxaline which is then chlorinated.

Compounds of Formula (1) or salts thereof wherein X and/or Y are sulfo groups may be prepared by sulfonation of the corresponding compound free from sulfo groups using oleum. Preferably, the temperature during the sulfonation reaction is less than 100° C., more preferably from 0 to 100° C. By controlling the conditions of sulfonation it is possible to prepare compounds of Formula (1) or salts thereof having different numbers of sulfonic acid groups. If desired the resultant sulfo groups may easily be converted to sulfonyl chloride groups and the sulfonyl chloride groups may be reacted with amines, ethers, thioethers etc. under alkaline conditions to give further compounds of Formula (1) or salts thereof.

The synthesis of compounds of Formula (1) or salts thereof may result in a single compound of Formula (1) or a mixture of compounds of Formula (1). When a mixture of compounds of Formula (1) or salts thereof results these compounds may be used in the printing process and inks as a mixture or they may be separated from each other and used individually.

The compounds of Formula (1) or salts thereof (especially those according to the second aspect of the present invention) are particularly useful as colorants for preparing inks, especially ink jet printing inks.

According to a third aspect of the present invention there is provided the use of a compound of Formula (1) or a salt thereof as defined in the first aspect of the present invention or according to the second aspect of the present invention for preparing an ink which comprises the compound of Formula (1) or a salt thereof and water, wherein the ink has a conductivity of less than 50 μS/m. Inks having such a low conductivity are especially useful for thermal ink jet printing as they tend to kogate the thermal resistor in the printer to a lesser extent.

The ink used in the printing process according to the first aspect of the present invention preferably comprises a liquid medium and a compound of Formula (1) or salt thereof as defined in the first aspect of the present invention.

Preferably, the ink comprises a liquid medium and a compound of Formula (1) or salt thereof according to the second aspect of the present invention.

A more preferred ink comprises:
  (a) from 0.01 to 30 parts of a compound of Formula (1) or salt thereof as defined in the first aspect of the present invention; and
  (b) from 70 to 99.99 parts of a liquid medium;
wherein the parts are by weight.

Preferably the number of parts of (a) and (b)=100.

The number of parts by weight of component (a) is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 90 parts.

Preferably, component (a) is completely dissolved in component (b). Preferably, component (a) has a solubility in component (b) at 20° C. of at least 10% by weight. This allows the preparation of liquid concentrates which may be used to prepare more dilute inks and reduces the chance of component (a) precipitating if evaporation of the liquid medium occurs during storage of the ink.

Preferably, the liquid medium contains less than 1% by weight, more preferably less than 0.1% by weight, of sodium chloride. Chloride ions tend to be corrosive towards the thermal heating element present in a thermal ink jet printing head.

The liquid medium preferably comprises a mixture of water and an organic solvent or an organic solvent free from water.

For IJP inks the liquid medium preferably comprises a mixture of water and an organic solvent. The weight ratio of water to organic solvent is preferably from 99:1 to 1:99, more preferably from 99:1 to 50:50 and especially from 95:5 to 70:30.

It is preferred that the organic solvent is a water-miscible organic solvent or a mixture of such solvents. Preferred water-miscible organic solvents include: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy) ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane.

Preferably, the liquid medium comprises water and 2 or more, especially from 2 to 8, water-miscible organic solvents.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A which are incorporated herein by reference thereto.

When the liquid medium comprises an organic solvent free from water, (that is, less than 1% water by weight) the liquid medium preferably has a boiling point of from 30° to 200° C., more preferably of from 30° to 150° C., especially from 30 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

The organic solvent free from water may be a single organic solvent or a mixture of two or more organic solvents. It is preferred that when the liquid medium is an organic solvent free from water it is a mixture of 2 to 5 different organic solvents. This allows a medium to be selected that gives good control over the drying characteristics and storage stability of the ink.

Liquid media comprising an organic solvent free from water are particularly useful when fast drying times are required and particularly when printing onto hydrophobic and/or non-absorbent substrates, for example plastics, metal and glass.

An especially preferred ink comprises:
(a) from 1 to 10 parts of a compound of Formula (1) or salt thereof as defined in the first aspect of the present invention or according to the second aspect of the present invention;
(b) from 2 to 60, more preferably 5 to 40 parts of water-miscible organic solvent(s); and
(c) from 97 to 30 parts of water;

wherein all parts are by weight.

Preferably the sum of the parts (a)+(b)+(c)=100.

According to a fourth aspect of the present invention there is provided an ink comprising a liquid medium and a compound of Formula (1) or a salt thereof according to the second aspect of the present invention. The ink is preferably an ink jet printing ink. The ink jet printing ink may also contain additional components suitable for use in ink jet printing inks, for example viscosity modifiers, corrosion inhibitors, biocides, kogation reducing additives, anti-cockle agents and surfactants.

Preferably, the ink jet printing ink has a viscosity of less than 50 mPa.s, more preferably less that 20 mPa.s and especially less than 5 mPa.s at a temperature of 25° C.

Any water present in the ink jet printing ink has preferably been purified. Examples of methods for purifying water include distillation, reverse osmosis, dialysis and ion-exchange. Such ink perform well in thermal ink jet printers as there are less salts present which may kogate the thermal heating element in the thermal ink jet printer.

The ink jet printing ink preferably has a concentration of halide ions of less than 500 parts per million, more preferably less than 100 parts per million. It is especially preferred that the ink has less than 100, more preferably less than 50 parts per million of divalent and trivalent metals, wherein parts refer to parts by weight relative to the total weight of the ink. Purifying the ink to reduce the concentration of these undesirable halide ions reduces kogation and/or corrosion of thermal heads in thermal ink jet printers and thereby improves long term print operability.

The pH of the ink jet printing ink is preferably from 4 to 11 more preferably from 7 to 10.

The ink jet printing ink may contain one or more colorants other than a compound of Formula (1) or salt thereof. These other colorants may be pigments but are preferably dyes. The compounds of Formula (1) or salts thereof may be used, for example, to tint blacks inks. Alternatively, inks containing compounds of Formula (1) or salts thereof may be tinted with colorants other than compounds of Formula (1) to provide, for example, brighter yellows or greens. The compounds may also be used as a shading component for dyes, for example they may be mixed with bluish-black dyes to provide a more neutral black colour.

As will be understood references to "ink jet printing ink" means inks suitable for use in ink jet printing even if such inks are not actually being so used at the time.

The ink of the present invention preferably forms the yellow ink of a yellow, magenta, cyan and black ink set. Typically, in such an ink set the magenta ink will contain for example C.I. Acid Red 52 or Pro-Jet™ Fast Magenta 2, the cyan ink will contain for example C.I. Direct Blue 86, 199 or Pro-Jet™ Fast Cyan 2 and the black ink will contain for example C.I. Direct Black 199 or Pro-Jet™ Fast Black 2. (Pro-Jet™ is a trade mark of Fujifilm Imaging Colorants Limited).

The ink may contain a mixture of compounds of Formula (1) or salts thereof.

According to a fifth aspect of the present invention there is provided an ink jet printer cartridge comprising a chamber and an ink which is an jet printing ink wherein the ink is present in the chamber and is as defined in the fourth aspect of the present invention.

According to a sixth aspect of the present invention there is provided an ink jet printer comprising a printing mechanism and a cartridge wherein the cartridge is as defined in the fifth aspect of the present invention.

Printing may be performed by any suitable means including both impact and non-impact printing methods. Preferably, the printing is performed by means of an ink jet printer.

The ink jet printer preferably applies the ink to the substrate in the form of droplets which are ejected through a small nozzle onto the substrate. Preferred ink jet printers are piezoelectric ink jet printers and thermal ink jet printers According to an seventh aspect of the present invention there is provided a substrate printed with an ink according to the fourth of the present invention. Preferably, the ink printed on the substrate is an ink jet printing ink.

The substrate is preferably paper, plastic, a textile, metal or glass, more preferably a treated substrate such as a coated paper or a coated transparent film.

Preferably, the substrate has a receptor coating for absorbing the ink.

The receptor coating may be either a porous coating or a coating comprising an absorbent polymer.

The image printed onto the substrate may be of any kind without limitation. Examples of images include text, drawings, tables, bar codes, photographs and the like.

The compounds of the present invention provide inks which when printed exhibit good light-fastness and ozone-fastness. The good light fastness of the present compounds is particularly surprising because these compounds are fluorescent and fluorescent compounds are often regarded as having very poor light-fastness.

The present invention will now be illustrated by the following non-limiting examples in which all parts are by weight unless stated to the contrary.

EXAMPLE 1

The compound of Formula (6) (as shown above) was prepared in the following manner.

Step 1: Preparation of the Compound of Formula (6)

2,3-Dichloroquinoxaline (25 g, 0.126 mol supplied by Aldrich) was suspended in N-methyl pyrrolidinone (250 mL) and the mixture was heated to a temperature of 140° C. to give a reaction mixture in the form of a solution. Ammonia gas from a lecture bottle was then bubbled through the reaction mixture and the reaction was monitored by HPLC. A water-filled Dreschel bottle was used to trap vented ammonia gas. After 2 hours, HPLC showed that the reaction was complete and the ammonia supply was discontinued. The reaction mixture was stirred for a further hour, then heated to a temperature of 180° C. and stirred for a further 5 hours, it was then allowed to cool to 25° C. The reaction mixture was filtered and the solid retained on the filter was washed with N-methyl pyrrolidinone. This solid was slurried in water to remove any inorganic impurities, filtered and then re-slurried in ethanol. The ethanol slurry was filtered and the solid filtered off was dried to provide 5.7 g of the compound of Formula (6).

Sulfonation of the Compound of Formula (6)

The compound of Formula (6) obtained from step 1 (2.86 g) was added portionwise to oleum (25 ml, 20% sulfur trioxide) with continuous stirring and whilst maintaining a temperature of less than 20° C. throughout. The resultant mixture was stirred for a further 18 hours at a temperature of 25° C. Ice was then added and this caused a precipitate to form. The precipitate was removed by filtration and washed with propan-2-ol (4.5 g). This resulted in an orange-yellow solid dye (hereinafter Dye 1) which was a mixture of compounds of Formulae (3) and (4) with the compounds of Formula (3) predominating.

EXAMPLE 2

The compound of Formula (7) (as shown above) was prepared in the following manner.

2,3, dichloroquinoxaline (0.1 mol, 20.3 g) was suspended in N-methyl pyrrolidinone (80 mL) to form a mixture. The mixture was heated to a temperature of 90° C. The 2,3, dichloroquinoxaline dissolved to from a solution Phenylethylamine (0.1 mol, 12.1 g) was then added to the solution followed by the addition of sodium carbonate (0.1 mol, 10.6 g). This formed a reaction mixture. The reaction mixture was heated to temperature of 130° C. for a period of 3 hours and then to 180° C. for a further 6 hours. The reaction mixture was then allowed to cool to 25° C. and stirred for approximately 16 hours. A solid precipitated from the cooled reaction mixture. The precipitated solid was isolated by filtration, washed with N-methyl pyrrolidinone and then with acetone. The solid was reslurried in water, filtered, washed with acetone and dried to provide the product compound of Formula (7) in the form of a orange coloured solid.

EXAMPLE 3

The compound of Formula (8) (as shown above) was prepared in the following manner.

The compound of Formula (7) as prepared in Example 2 was gradually added to concentrated sulphuric acid (19 mL) at a temperature of 25° C. to form a reaction mixture. An exotherm was observed which raised the temperature of the reaction mixture to 35° C. The reaction mixture was then stirred for 24 hours at a temperature of 25° C. Then the reaction mixture was heated to 50° C. for 48 hours. HPLC showed that a single product compound had been prepared. The product was precipitated by drowning out the reaction mixture into a mixture of ice and water. The precipitate was filtered and washed with water. The washed product was then dialysed, and dried to provide the compound of Formula (8) in the form of a yellow coloured solid (hereinafter Dye 2).

EXAMPLE 4

The compound of Formula (9) (as shown above) was prepared in the following manner.

The compound of Formula (7) as prepared in Example 2 (1.88 g, 0.0035 mol) was added gradually to 20% oleum (10 mL) at a temperature of 25° C. to form a reaction mixture. An exotherm to a temperature of 40° C. was observed. The reaction mixture was then stirred at a temperature of 25° C. for a period of 18 hours. After this time HPLC analysis showed complete conversion to a mixture of several different sulfonated compounds of Formula (9). The reaction mixture was drowned out into a mixture of ice and water and the product was precipitated by the addition of 30% sodium chloride solution. The precipitated product was isolated by filtration, redissolved in water at pH8, dialysed and dried. This resulted in a mixture of Compounds of Formula (9) containing 3,4,5 or 6 sulfonic acid groups (hereinafter Dye 3).

Optical Properties

Dye 1 had a $\lambda_{max}$ value of 438 nm and an extinction coefficient of 65,000 dm$^3$ mol$^{-1}$ cm$^{-1}$ at this wavelength.

Ink 1

Ink 1 was prepared containing Dye 1 by mixing the components in Table 1.

TABLE 1

| Component | Ink 1 |
|---|---|
| Pyrrolidone | 5 |
| Thiodiethylene glycol | 5 |
| Surfynol ™ 465 | 1 |
| Dye (1) | 3 |
| Water | 86 |

In table 1 all parts were by weight. Surfynol ™ is a registered trademark of Air Products.

Printing

Ink 1 was printed using a Canon i965 ink jet printer onto SEC Premium Photo paper.

Chroma and Reflectance Optical Density

The CIE colour co-ordinates of each print (a, b, L, Chroma "C" and hue "h") and Reflectance Optical Density (ROD) were measured using an Gretag Macbeth Spectrodensitometer. Chroma values above 80 indicate a vivid colour and RODs above 1.3 indicate good image density.

The initial prints at 100% density had the following colour characteristics

TABLE 2

| ROD | L | a | b | C | h |
|---|---|---|---|---|---|
| 1.47 | 88 | −10 | 85 | 85 | 96 |

As can be seen Ink 1 provided prints having excellent ROD with a vivid yellow hue.

Ozone Fastness

Prints were tested for ozone fastness using an ozone test cabinet from Hampden Test Equipment. The test was carried out for 192 hours at 40° C. and 55% relative humidity in the presence of 1 part per hundred million of ozone. The fastness of the printed ink to ozone was judged by the percentage reduction in the optical density before and after exposure to ozone using an Gretag Macbeth spectrodensitometer. Thus, the lower the loss of optical density the greater the ozone fastness.

After the ozone fastness test the prints obtained from Ink 1 had lost only 6% of their initial ROD. This showed excellent resistance to ozone induced fading.

Printing Properties

In addition to the abovementioned properties the Ink 1 ink jet printed with good operability.

Further Inks

The further inks described in Tables I and II may be prepared. Numbers quoted in the columns refer to the number of parts of the relevant component and all parts are by weight. The inks may be applied to paper by thermal or piezo ink jet printing.

The following abbreviations are used in Table I and II:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$
TBT=tertiary butanol
TDG=thiodiglycol

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 1 | 3.0 | 90 | | 5 | 5 | | 0.2 | | | | | |
| 1 | 10.0 | 85 | 3 | | 3 | 3 | | | | 5 | 1 | |
| 1 | 2.1 | 91 | | 8 | | | | | | | | 1 |
| 1 | 3.1 | 86 | 5 | | | | | 0.2 | 4 | | | 5 |
| 1 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 1 | 5 | 65 | | 20 | | | | | 10 | | | |
| 1 | 2.4 | 75 | 5 | 4 | | 5 | | | | 6 | | 5 |
| 1 | 4.1 | 80 | 3 | 5 | 2 | 10 | | 0.3 | | | | |
| 1 | 3.2 | 65 | | 5 | 4 | 6 | | | 5 | 4 | 6 | 5 |
| 1 | 5.1 | 96 | | | | | | | | 4 | | |
| 1 | 10.8 | 90 | 5 | | | | | | 5 | | | |
| 1 | 10.0 | 80 | 2 | 6 | 2 | 5 | | | 1 | | 4 | |
| 1 | 1.8 | 80 | | | 5 | | | | | | 15 | |
| 1 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 1 | 9.0 | 90 | | 5 | | | | | | 1.2 | | 5 |
| 1 | 1.5 | 85 | 5 | 5 | | 0.15 | 5.0 | 0.2 | | | | |
| 1 | 2.5 | 90 | | 6 | 4 | | | | | 0.12 | | |
| 1 | 3.1 | 82 | 4 | 8 | | 0.3 | | | | | | 6 |
| 1 | 0.9 | 85 | | 10 | | | | | 5 | 0.2 | | |
| 1 | 8.0 | 90 | | 5 | 5 | | | 0.3 | | | | |
| 1 | 4.0 | 70 | | 10 | 4 | | | | 1 | | 4 | 11 |
| 1 | 2.2 | 75 | 4 | 10 | 3 | | | | 2 | | 6 | |
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 1 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | 8 | | | 12 | |
| 1 | 10 | 80 | | 10 | | | | | | | | |

The invention claimed is:

1. A process for printing an image on a substrate comprising applying to the substrate an ink comprising a compound of Formula (1) or a salt thereof:

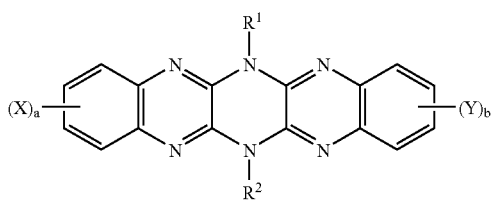

Formula (1)

wherein:
 $R^1$ and $R^2$ are each independently H or a substituent;
 each X and Y independently is a substituent; and
 a and b are each independently 0, 1, 2, 3 or 4.

2. A process according to claim 1 wherein $R^1$ and $R^2$ are each independently H, optionally substituted alkyl, optionally substituted alkoxy, optionally substituted aryl or optionally substituted aryloxy.

3. A process according to claim 1 wherein a and b are not both zero.

4. A process according to claim 1 wherein $R^1$ and $R^2$ are H.

5. A process according to claim 1 wherein each X and each Y independently is optionally substituted alkyl, optionally substituted alkoxy, optionally substituted aryl, optionally substituted aryloxy, optionally substituted heterocyclyl, poly(alkyleneoxy), —$NR^3R^4$, —$NHC(O)R^4$, —NHC(O)$NR^3R^4$, —C(O)$R^4$, —C(O)O$R^4$, —C(O)$NR^3R^4$—$PO_3H_2$, —$SR^3$, —$SO_2R^3$, —$SO_2OR^3$, —$SO_2NR^3R^4$, —S(O)$R^3$, —$CF_3$, —CN, —$NO_2$ or halo, wherein $R^3$ and $R^4$ are each independently H, optionally substituted $C_{1-8}$-alkyl or optionally substituted aryl, or $R^3$ and $R^4$ together with the nitrogen atom to which they are attached form an optionally substituted 5- or 6-membered ring.

6. A process according to claim 1 wherein the compound of Formula (1) or a salt thereof has at least one poly(ethyleneoxy), —$SO_2NR^3R^4$, phosphato group or carboxy group wherein $R^3$ and $R^4$ are each independently H, optionally substituted $C_{1-8}$-alkyl or optionally substituted aryl, or $R^3$ and $R^4$ together with the nitrogen atom to which they are attached form an optionally substituted 5- or 6-membered ring.

7. A process according to claim 1 wherein X and Y are sulfo and a and b are each independently 0,1 or 2 provided that a and b are not both zero.

8. A process according to claim 1 wherein the compound of Formula (1) is of Formula (2), Formula (3) or Formula (4), a salt thereof, or a mixture of 2 or more of compounds of Formula (2), Formula (3) or Formula (4) or salts thereof:

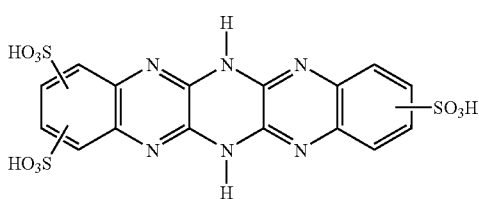

Formula (2)

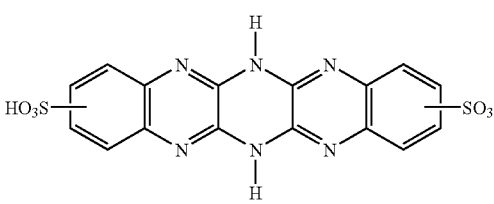

Formula (3)

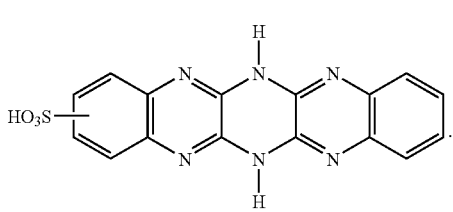

Formula (4)

9. A compound of Formula (1) or a salt thereof:

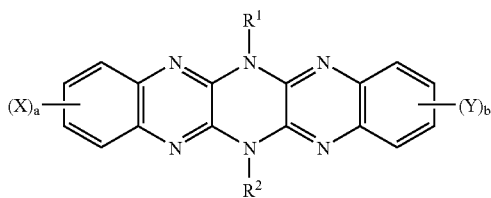

Formula (1)

wherein:
$R^1$ and $R^2$ are each independently H, optionally substituted alkyl, optionally substituted alkoxy, optionally substituted aryl or optionally substituted aryloxy;
each X and Y independently is a substituent selected from the group consisting of optionally substituted alkyl, optionally substituted alkoxy, optionally substituted aryl, optionally substituted aryloxy, optionally substituted heterocyclyl, poly(alkyleneoxy), —$NR^3R^4$, —$NHC(O)R^4$, —$NHC(O)NR^3R^4$, —$C(O)R^4$, —$C(O)NR^3R^4$, —$PO_3H_2$, —$SR^3$, —$SO_2R^3$, —$SO_2OR^3$, —$SO_2NR^3R^4$, —$S(O)R^3$, —$CF_3$, —CN, —$NO_2$ or halo, wherein $R^3$ and $R^4$ are each independently H, optionally substituted $C_{1-8}$-alkyl or optionally substituted aryl, or $R^3$ and $R^4$ together with the nitrogen atom to which they are attached from an optionally substituted 5- or 6-membered ring;
a and b are each independently 0, 1, 2, 3 or 4; and
the compound of Formula (1) or salt thereof is a water-soluble dye; with the proviso that the compound of Formula (1) or salt thereof is not a compound of Formula (3), (4) or (5) in the form of the free acid or the sodium salt:

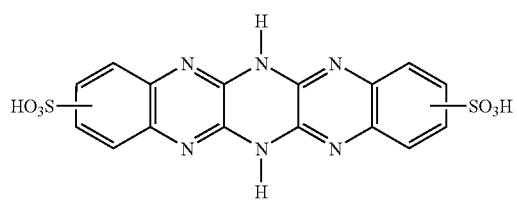

Formula (3)

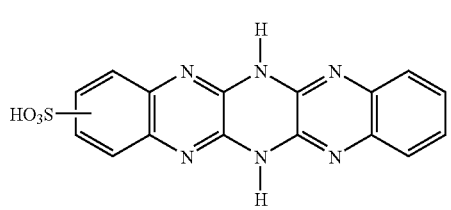

Formula (4)

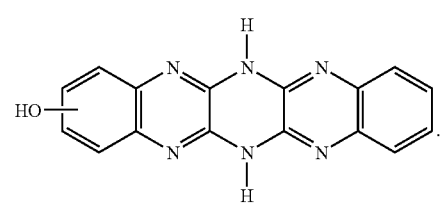

Formula (5)

10. A compound of Formula (1):

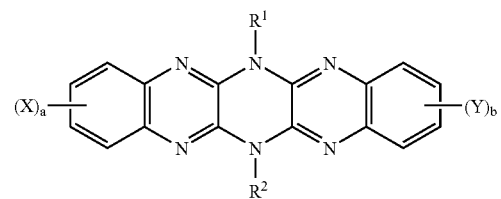

Formula (1)

wherein:
$R^1$ and $R^2$ are each independently H or a substituent;
each X and Y independently is a substituent;
a and b are each independently 0, 1, 2, 3 or 4; and wherein said compound of Formula (1) is a water-soluble dye which is an ammonium, substituted ammonium or lithium salt or mixture thereof.

11. A compound of Formula (1) or a salt thereof:

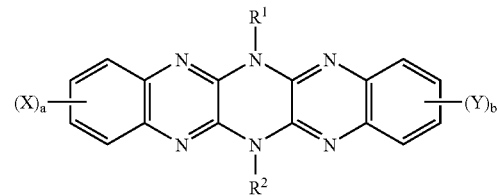

Formula (1)

wherein:
$R^1$ and $R^2$ are each independently H or a substituent;
each X and Y independently is a substituent;
a and b are each independently 0, 1, 2, 3 or 4; and wherein said compound of Formula (1) or salt thereof is a water-soluble dye which has a total of 2, 3 or 4 sulfo groups;

with the proviso that the compound of Formula (1) or salt thereof is not a compound of Formula (3) in the form of the free acid or the sodium salt:

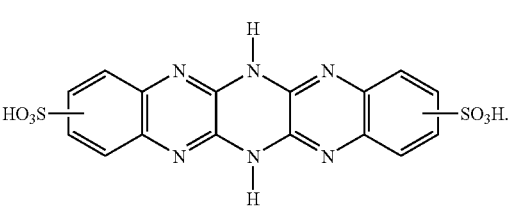

Formula (3)

12. A compound of Formula (1) or a salt thereof:

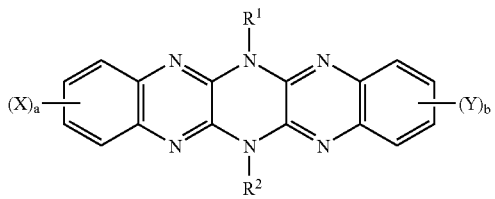

Formula (1)

wherein:
R¹ and R² are each independently H or a substituent;
each X and Y independently is a substituent;
a and b are each independently 0, 1, 2, 3 or 4; and wherein said compound of Formula (1) or salt thereof is a water-soluble dye which has at least one polyethyleneoxy, phosphato, or —SO₂NR³R⁴ group, wherein R³ and R⁴ are each independently H, optionally substituted $C_{1-8}$-alkyl or optionally substituted aryl, or R³ and R4 together with the nitrogen atom to which they are attached form an optionally substituted 5- or 6-membered ring.

13. A compound of Formula (1) or a salt thereof:

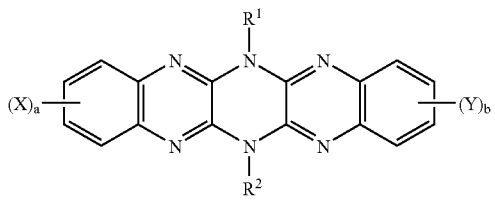

Formula (1)

wherein:
R¹ and R² are each independently H or a substituent;
each X and Y independently is a substituent;
a and b are each independently 0, 1, 2, 3 or 4; and wherein said the compound of Formula (1) or salt thereof is a water-soluble dye which has at least one sulfo group and at least one group other than a sulfo group.

14. An ink comprising a liquid medium and a compound of Formula (1) or a salt thereof:

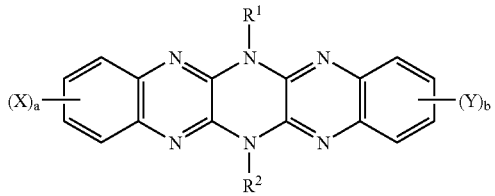

Formula (1)

wherein:
R¹ and R² are each independently H or a substituent;
each X and Y independently is a substituent;
a and b are each independently 0, 1, 2, 3 or 4; and
the compound of Formula (1) or salt thereof is a water-soluble dye.

15. An ink according to claim 14 which is an ink jet printing ink.

16. An ink jet printer cartridge comprising a chamber and an ink wherein the ink is present in the chamber and the ink is according to claim 15.

17. An ink jet printer comprising a printing mechanism and a cartridge wherein the cartridge is according to claim 16.

18. A substrate printed with the ink according to claim 14.

19. A method for preparing an ink which comprises adding to a liquid medium a compound of Formula (1) or a salt thereof:

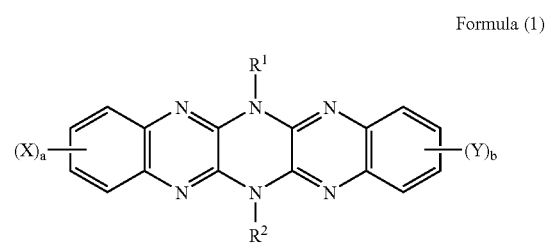

Formula (1)

wherein:
R¹ and R² are each independently H or a substituent;
each X and Y independently is a substituent; and
a and b are each independently 0, 1, 2, 3 or 4;
and water, wherein the ink has a conductivity of less than 50 μS/m.

20. A compound of Formula (1) or a salt thereof:

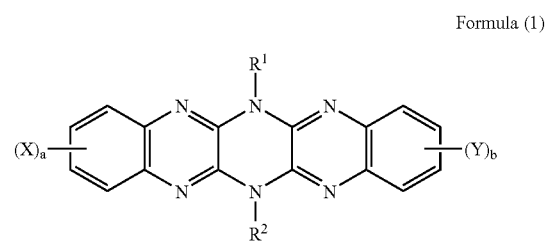

Formula (1)

wherein:
R¹ and R² are each independently H or a substituent;
each X and Y independently is a substituent;
a and b are each independently 0, 1, 2, 3 or 4; and
the compound of Formula (1) or salt thereof is a water-soluble dye;
with the proviso that the compound of Formula (1) or salt thereof is not a compound of Formula (3), (4) or (5) in the form of the free acid or the sodium salt;

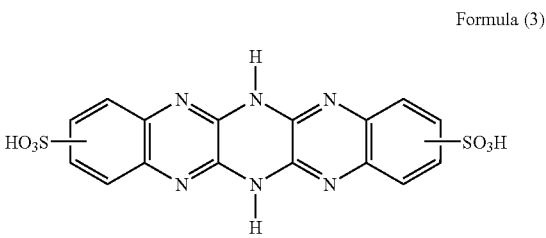

Formula (3)

Formula (4)

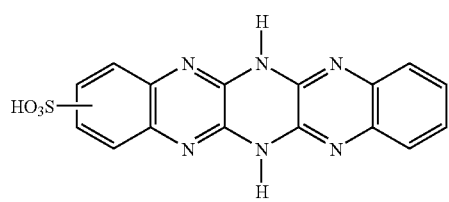

Formula (5)

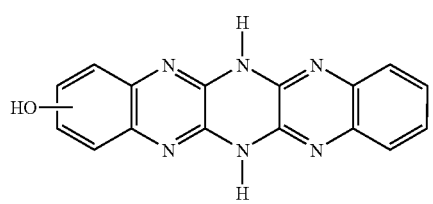

wherein the X and Y groups are each independently selected from the group consisting of poly(ethyleneoxy), sulfo, -phosphato, or $-SO_2NR^3R^4$ groups wherein $R^3$ and $R^4$ are each independently H, optionally substituted $C_{1-8}$-alkyl or optionally substituted aryl, or $R^3$ and $R^4$ together with the nitrogen atom to which they are attached form an optionally substituted 5-or 6-membered ring and a and b are not both zero.

21. A compound of any one of Formulae (8), (9) or (12) or a salt thereof which is a water-soluble dye:

Formula (8)

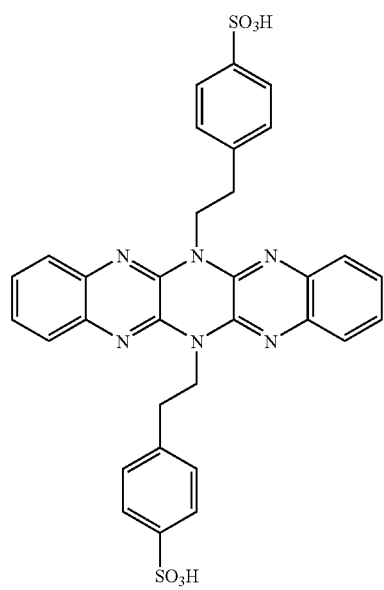

Formula (9)

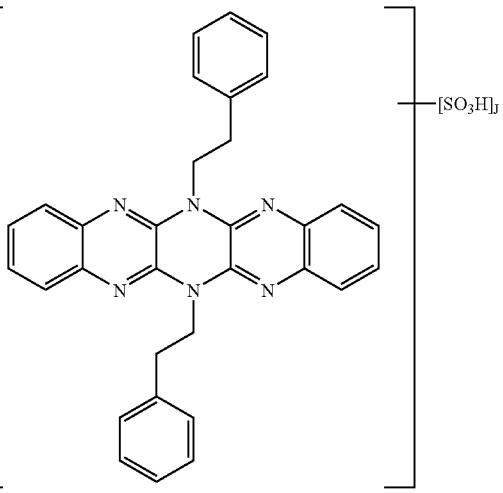

wherein J is from 3 to 6;

22. A compound according to claim 21 of Formula (11) or a salt thereof:

Formula (11)

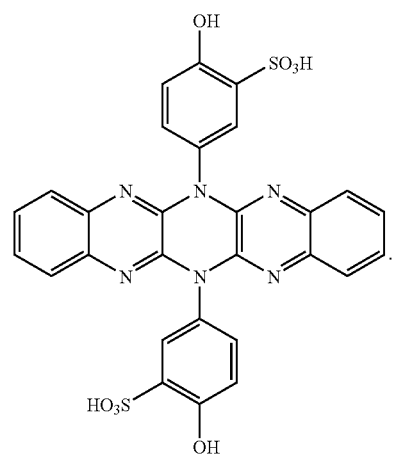

23. A process according to claim 1 wherein the printing is performed by means of an ink jet printer.

* * * * *